United States Patent [19]

Morita et al.

[11] Patent Number: 5,973,716
[45] Date of Patent: *Oct. 26, 1999

[54] IMAGE FORMING APPARATUS

[75] Inventors: Shinji Morita; Yasuo Tsurubuchi; Akitoshi Matsubara, all of Hachioji, Japan

[73] Assignee: Konica Corporation

[*] Notice: This patent issued on a continued prosecution application filed under 37 CFR 1.53(d), and is subject to the twenty year patent term provisions of 35 U.S.C. 154(a)(2).

[21] Appl. No.: 08/705,640

[22] Filed: Aug. 30, 1996

[30] Foreign Application Priority Data

Sep. 12, 1995 [JP] Japan .................................. 7-258290

[51] Int. Cl.$^6$ .............................. B41J 2/47; B41J 2/435; G11B 7/08; H04N 1/23
[52] U.S. Cl. ........................................................ 347/233
[58] Field of Search .................................. 347/129, 233, 347/115, 232, 241–247; 399/38; 359/205, 196, 216, 201, 204; 358/408, 409, 480, 481

[56] References Cited

U.S. PATENT DOCUMENTS

| 5,278,586 | 1/1994 | Yoneda et al. | 347/116 |
| 5,471,236 | 11/1995 | Ito | 347/233 |
| 5,771,061 | 6/1998 | Komurasaki et al. | 347/242 |

*Primary Examiner*—N. Le
*Assistant Examiner*—L. Anderson
*Attorney, Agent, or Firm*—Jordan B. Bierman; Bierman, Muserlian and Lucas

[57] ABSTRACT

An image forming apparatus includes a photoreceptor; a plurality of laser beam generation means for generating a plurality of laser beams, respectively; and an optical system in which the plurality of laser beams pass through and scan simultaneously a plurality of lines on the photoreceptor, and thereby dot images are formed on the photoreceptor. The difference in wavelength among the plurality of laser beams is less than a diameter of one dot of laser beam.

12 Claims, 2 Drawing Sheets

IMAGE FORMING APPARATUS

BACKGROUND OF THE INVENTION

The present invention relates to an image forming apparatus and a production method thereof, which are applied to an electrophotographic copier, a laser beam printer, or similar equipment in which an image is written by a laser beam.

Recently, an electrophotographic copier, printer, or similar equipment in which an image is written by a laser beam, is much in use, and an image forming apparatus, which can conduct higher speed copying, is required for the market. However, when the speed of the image forming apparatus is made higher, it is difficult to achieve a high speed because an image is written on each line by laser beam scanning. To achieve a higher speed, although it is required to stably rotate a polygonal mirror, which controls the optical scanning speed at a higher rate, it is difficult to achieve the higher speed with the present mechanism of the image forming apparatus.

For this purpose, the following has been proposed: a plurality of laser beams are simultaneously used for scanning to increase the writing speed more than two times.

However, when a plurality of laser beams are used for scanning, a difficult problem occurs in the positioning of a primary scanning direction and a subsidiary scanning direction with respect to each other. Specifically, due to some deviation of one laser beam to the other on an image, irregularity occurs on the peripheral portion of the image, and reproducibility of fine lines, image density, gradation reproducibility, and a degree of resolution become poor, so that a high quality image can not be provided. Although the wavelength of a semiconductor laser beam is monistically determined by semiconductor material in principle, a slight difference of the wavelength occurs due to fluctuations of its composition or its crystal system. For this reason, when an image is written by a plurality of laser beams, this slight fluctuation of the wavelength largely adversely affects the image writing.

That is, when a plurality of laser beams pass through the same optical system for scanning, the beams are required to pass through various types of lenses for appropriate exposure scanning. However, when the wavelength is different from each other, the beam's speed passing through the lenses is different from each other. In this case, when the plurality of laser beams are used for exposure scanning, the arrival time is different from each other. Accordingly, the length of the exposure scanning in the primary scanning direction is different, and the writing position in the direction of the primary scanning is different, resulting in image deviation. Further, also due to the difference of the refractive index of each laser beam due to aberration of an fθ lens, the phenomena of deviation in the primary scanning direction is amplified. This deviation of the image results in a deviation of 4 $\mu$m on a image per 1 nm of the difference of the wavelength. Accordingly, when a plurality of laser beams having fluctuations in the wavelength are arbitrarily combined with each other, the difference of the wavelength of laser beams is 30 nm at the maximum, and the deviation is 120 $\mu$m on the image. Thereby, irregularity occurs on the peripheral portion of the image, and reproducibility of fine lines, image density, gradation reproducibility, and resolution become poor, so that a high quality image can not be provided.

Accordingly, it is preferable to manufacture a laser with small fluctuations in the production of the laser itself. Because the wavelength of oscillation of the semiconductor laser is mainly determined by the width of forbidden band of active material included in a mixed crystal, it may be possible that crystal is formed by strictly controlling the component, in principle. However, it is almost impossible to perform the above-described production in practice.

SUMMARY OF THE INVENTION

Accordingly, the object of the present invention is to provide an image forming apparatus and its production method, in which any image deviation is not generated even when a plurality of laser beams are used, so that a high quality image can be written; and no irregularity exists on the peripheral portion of the image, and an high quality image having excellent reproducibility of fine lines, excellent image density, gradation reproducibility, and the degree of resolution, can be reproduced.

The above-described object is attained by an image forming apparatus comprising the following units. An image forming apparatus comprising:

a photoreceptor;

plural-laser beam generating means; and an optical system, wherein a plurality of laser beams, generated by the plural laser beam generation means, pass (through the optical system) and simultaneously scan a plurality of lines on the photoreceptor, thereby, a dot image is formed on the photoreceptor, and the dimension of deviation between the laser beams on the photoreceptor is not larger than a diameter per 1 dot of the laser beam.

Further, the above-described object is attained by an image forming apparatus comprising the following units. An image forming apparatus comprising:

a photoreceptor;

a plurality of semiconductor laser elements; and an optical system, wherein a plurality of laser beams, generated by the plurality of semiconductor laser elements, pass (through the optical system) and simultaneously scan a plurality of lines on the photoreceptor, thereby, a dot image is formed on the photoreceptor, and the difference of wavelength between the plurality of laser elements is not larger than 12 nm.

Still further, the above-described object is attained by an image forming apparatus comprising the following units. An image forming apparatus comprising:

a photoreceptor;

a plurality of semiconductor laser elements; and an optical system, wherein a plurality of laser beams, generated by the plurality of semiconductor laser elements, pass (through the optical system) and simultaneously scan a plurality of lines on the photoreceptor, thereby, a dot image is formed on the photoreceptor, and the difference of wavelength between the plurality of laser elements is not larger than 1/4000 of a diameter per 1 dot of the laser beam.

DETAILED EXPLANATION OF THE INVENTION

Referring to drawings, examples of the present invention will be specifically explained below.

Figure 1:
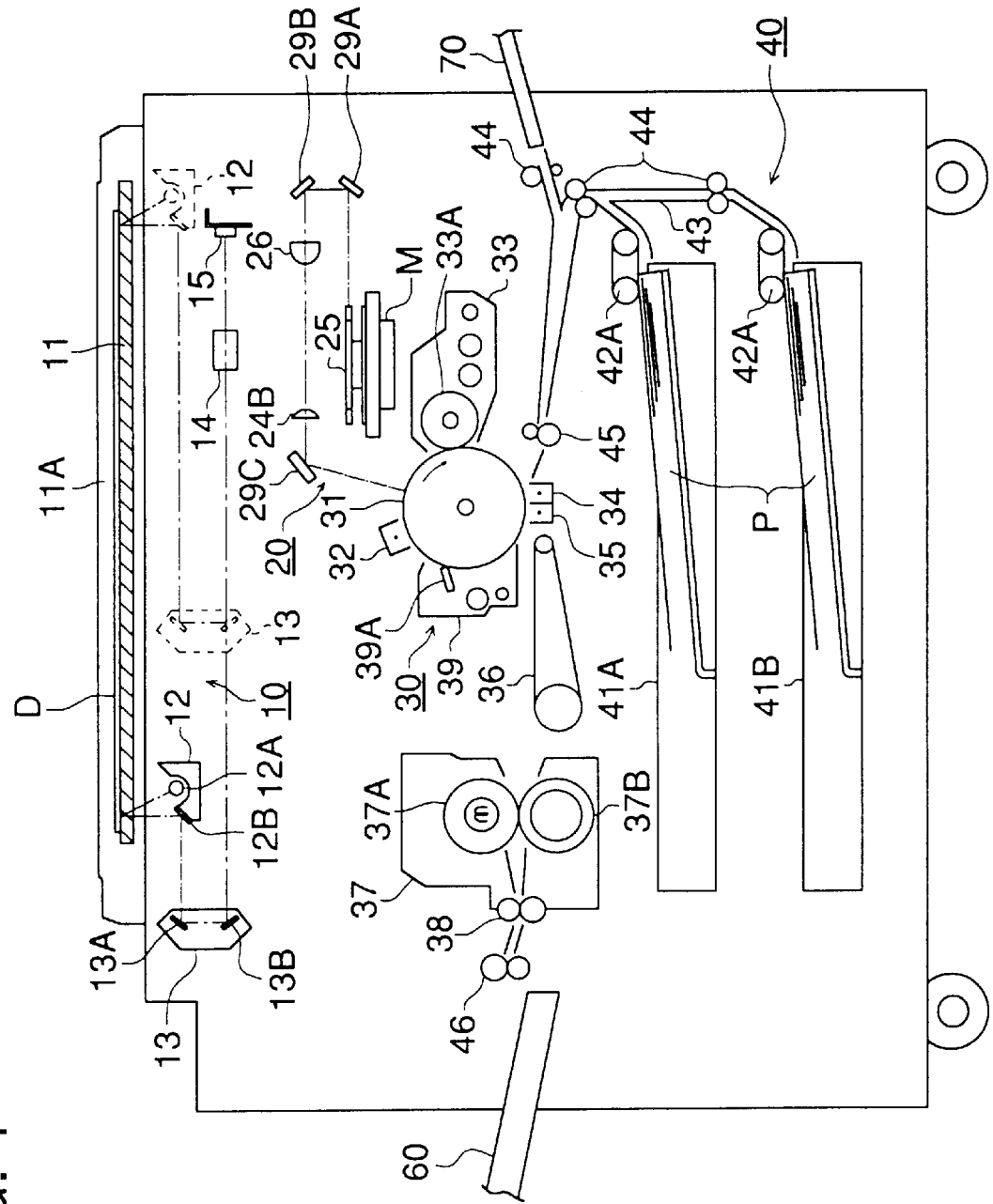
FIG. 1 is a sectional view showing an outline structure of an example of an image forming apparatus of the present invention.

FIG. 1 is a sectional view showing an outline structure of an example of an image forming apparatus for which the present invention is applied. The image forming apparatus comprises an image reading section 10, a laser writing section 20, an image forming section 30, and a sheet feeding section 40.

In the upper portion of the image forming apparatus, a platen 11 composed of a transparent glass plate, and an original placing section composed of an original cover 11A which covers an original D placed on the platen, are provided. An image reading section 10 composed of the first mirror unit 12, the second mirror unit 13, a primary lens 14, and an image pick-up element 15, is provided below the platen 11 in the main body of the apparatus. In the drawing, the first mirror unit 12 is provided with an exposure lamp 12A and the first mirror 12B, and is mounted in such a manner that it is in parallel with the platen 11, and can linearly move horizontally. The first mirror unit 12 optically scans the entire surface of an original D. The second mirror unit 13 is integrally provided with the second mirror 13A and the third mirror 13B, and linearly moves at ½ speed of the first mirror unit 12 in the same horizontal directions so that a predetermined optical path length can be constantly maintained. Of course, the second mirror unit 13 moves in parallel with the platen in the same manner as the first mirror unit 12. An image of the original D on the platen 11, illuminated by the exposure lamp 12A, is formed on the image pick-up element 15 composed of a CCD, or the like, by a primary lens 14 through the first mirror 12B, the second mirror 13A, and the third mirror 13B. When scanning has been completed, the first mirror unit 12 and the second mirror unit 13 return to the original position and wait for the next image formation.

Image data obtained by the image pick-up element 15 is processed by an image signal processing section, not shown in the drawing, and temporarily stored in a memory as an image signal.

When an image signal from the memory is inputted into a laser writing section 20, composed of a drive motor M, a polygonal mirror 25 with 8 reflection surfaces and rotating at 16,535 rpm, an fθ lens 26, and 2 sets of laser units, then, an image formation section 30 starts an image recording operation. That is, a photoreceptor drum 31, provided with a phthalocyanine type photoreceptor, of 80 mm diameter, rotates clockwise, as shown by an arrow, at a peripheral speed of 280 mm/sec; because the photoreceptor is given electric charges by a charger 32 and is charged at a electric potential of −700 V, 2-beam writing, in which 2 scanning lines are simultaneously written by 2 laser beams, is conducted by a laser beam writing section 20; and an electrostatic latent image corresponding to the original D is formed on the photoreceptor drum 31. Then, the electrostatic latent image on the photoreceptor drum 31 is developed by toner in the developer, carried by a developing sleeve 33A, on which a bias voltage of −600 V is applied, having a diameter of 40 mm and the number of rotations of 200 rpm, provided in the developing unit 33 in which 2-component developer is accommodated, and then a visual toner image is formed.

On the other hand, a specified sized transfer sheet P is fed by a single sheet by a sheet feed roller 42A from a sheet feed cassette 41A or 41B, loaded in a sheet feed section 40, and is fed to a image transfer section through a guide 43 and a sheet feed roller 44. The transfer sheet P thus fed, is sent onto the photoreceptor drum 31 by a registration roller 45, operating in a timed relationship with a toner image on the photoreceptor drum 31. The toner image on the photoreceptor drum 31 is transferred onto the transfer sheet P by a transfer unit 34. After the transfer sheet P is separated from the photoreceptor drum 31 by the discharging action of a separation unit 35, the sheet P is sent to a fixing unit 37 through a conveyance belt 36. After the image on the transfer sheet P has been fused and fixed by a heat fixing roller 37A and a pressure-contact roller 37B, the sheet P is delivered by sheet delivery rollers 38 and 46 onto a tray 60 provided outside the apparatus.

Numeral 70 is a tray for manually inserted sheets, and a manually inserted transfer sheet is fed to the registration roller 45 by the sheet feed roller 44.

The photoreceptor drum 31 is further rotated, and after the remaining toner which has not been transferred, is cleaned by a cleaning blade 39A made of polyurethane rubber, which is provided in a cleaning unit 39 and is in pressure-contact with the photoreceptor drum 31, the photoreceptor drum 31 is charged again by the charger 32, and enters into the next image formation process.

Figure 2:
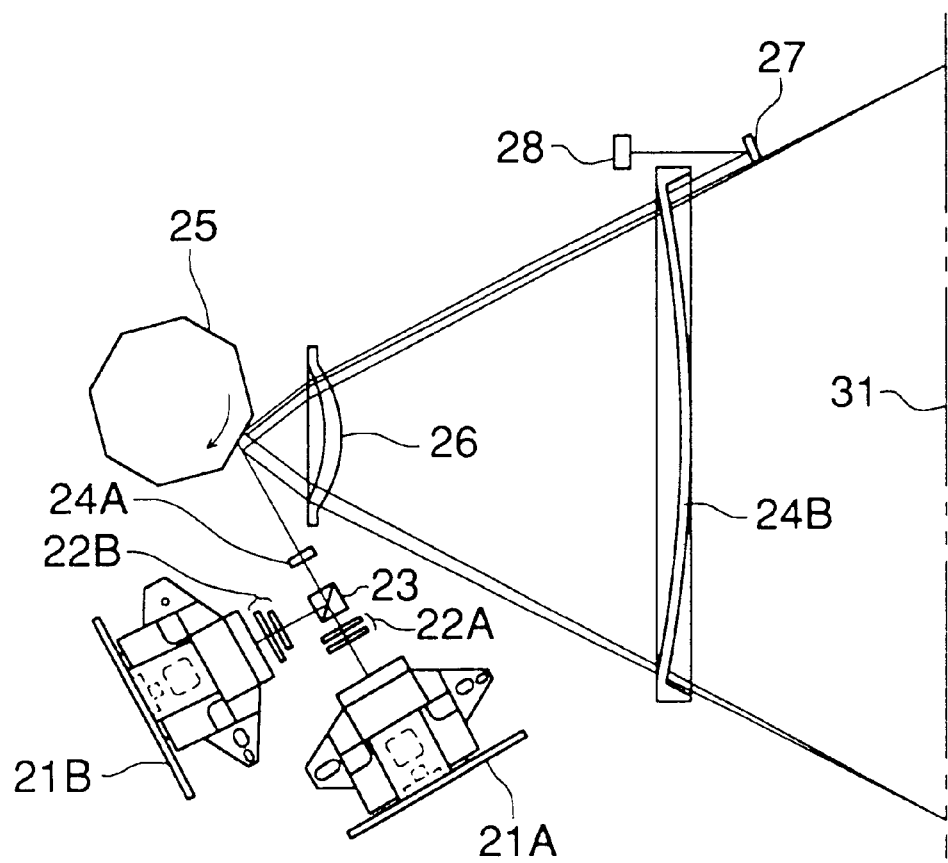
FIG. 2 is a plan view showing a scanner unit of the apparatus in FIG. 1.

FIG. 2 is a plan view showing the laser writing section 20 of the apparatus shown in FIG. 1, and reflection mirrors 29A, 29B, and 29C are omitted.

In FIG. 2, numerals 21A and 21B are laser units, and each unit integrally includes: a semiconductor laser which is turned on/off corresponding to an image signal; a collimator lens which converts a laser beam emitted from a semiconductor laser into parallel beams; and an automatic output controller (APC) which observes an output of the semiconductor laser and controls an applied current value so that the output is constantly maintained at a predetermined value. Numerals 22A and 22B are adjustment prisms which adjust the direction of laser beam emission. Numeral 23 is a translucent prism which is a composite prism to convert the direction of 2 emitted laser beams, which are perpendicular to each other, in the same direction. Numerals 24A and 24B are cylindrical lenses provided to compensate for a tilt angle error of each reflection surface of a polygonal mirror. Numeral 27 is a mirror to reflect the laser beam onto a beam detector 28. The beam detector 28 detects passage of the laser beam and generates an image writing signal, and controls the timina of the start of drive of the laser units 21A and 21B by the image signal so that the image writing position on the photoreceptor drum 31 is constantly fixed.

Two laser beams emitted from the laser units 21A and 21B are reflected by the polygonal mirror 25, and scan and expose on the photoreceptor drum 31 through the fθ lens 26, cylindrical lenses 24A and 24B, and reflection mirrors 29A through 29C. At this time, the laser beams are formed into spot-like images adjoining in the subsidiary scanning direction, and beam writing, by which 2 scanning lines are simultaneously written, is conducted on the photoreceptor drum 31. Due to this operation, image signals on alternate scanning lines are simultaneously inputted into the laser units 21A and 21B, and 2 scanning lines are written at a time, so that an image can be recorded at a printing speed which is 2 times faster than that of an apparatus using a single laser unit.

In order to obtain a high quality image substantially, it is determined that a deviation between laser beams on the image is within 1 dot-diameter of the laser beam. Because a deviation on the image is approximately 4 μm per the difference of wavelength of 1 nm in the semiconductor laser, it may be allowed that the difference between the wavelength of laser beams is not larger than 1/4000 of 1 dot-diameter of the laser beam in order to suppress a deviation between laser beams within 1 dot-diameter of the laser beam, and therefore, the semiconductor laser elements, having such difference of wavelength, are selected and combined.

Generally, the laser beams used have a 1 dot-diameter of 50 to 100 μm. Accordingly, the 1 dot-diameter of the laser beam may be not larger than 50 μm in order to suppress a deviation on the image within 1 dot-diameter of the laser beam. Because an image deviation is approximately 4 μm per the difference of wavelength of 1 nm, the image deviation is less than 48 μm when the difference of wavelength of the laser beam is not larger than 12 nm, and this value is less than 1 dot-diameter of the laser beam, resulting in a high quality image. Accordingly, semiconductor laser elements having the wavelength of not larger than 12 nm may be selected and combined.

DETAILED DESCRIPTION OF THE PREFERRED EMBODIMENT

In the present invention, Ga-As semiconductor lasers are used. Two Ga-As semiconductor lasers of a laser A and a laser B, shown in Table 1, are selected from a 100 Ga-As semiconductor laser's lot, the oscillation wavelength of which ranges from 765 nm to 795 nm, and are combined, and a scanner shown in FIG. 2 is produced.

Next, a character image and a fine line image are used as an original, and image formation is carried out. The image quality is visually checked and evaluated, and the results are shown in Table 1.

TABLE 1

| | The wavelength of laser beam | | Difference of wavelength of beams | Deviation of beams in the primary scanning direction | Image quality |
|---|---|---|---|---|---|
| | Laser A | Laser B | | | |
| The present invention 1 | 780 nm | 781 nm | 1 nm | 4 μm | A |
| The present invention 2 | 780 nm | 786 nm | 6 nm | 24 μm | A |
| The present invention 3 | 780 nm | 792 nm | 12 nm | 48 μm | B |
| Comparative example 1 | 780 nm | 794 nm | 14 nm | 56 μm | C |
| Comparative example 2 | 771 nm | 789 nm | 18 nm | 72 μm | D |
| Comparative example 3 | 775 nm | 795 nm | 30 nm | 120 μm | D |

In Table 1, Image quality "A" represents a very good case for obtaining a high quality image in which no irregularity exists on the peripheral portion of the image; and reproducibility of fine line, image density, and gradation, and the degree of resolution are excellent. Image quality "B" represents a good case for obtaining a high quality image in which some irregularity exists on the peripheral portion of the image; and reproducibility of fine line, image density, and gradation, and the degree of resolution are excellent. Image quality "C" represents a poor case in which a low quality image, having the irregularity on the peripheral portion of the image and poor reproducibility of fine line, gradation, and degree of resolution, is obtained. Image quality "D" represents a very poor case in which a very poor image, having the irregularity on the peripheral portion of the image and very poor reproducibility of fine line, image density, reproducibility of gradation, and degree of resolution, is obtained.

Accordingly, in the present invention, when the difference of the wavelength of the laser beam is not large than 12 nm, a high quality image can be obtained in which the reproducibility of fine line, the image density, the reproducibility of gradation, and the degree of resolution are excellent. More preferably, when the difference of wavelength of the laser beam is not larger than 6 nm, an excellent image can be obtained in which no irregularity exists on the entire peripheral portion of the image.

As described above, according to an image forming apparatus of the present invention and a production method thereof, even when a plurality of laser beams are used, an image deviation is not generated and a high quality image can be written, and thereby, a high quality image can be reproduced in which no irregularity exists on the peripheral portion of the image; and the reproducibility of fine line, the image density, the reproducibility of gradation, and the degree of resolution are excellent.

What is claimed is:

1. An image forming apparatus comprising:
   (a) a photoreceptor;
   (b) a plurality of laser beam generating devices for generating a plurality of laser beams,
   (c) an optical system, including a composing device through which said laser beams pass and from which said laser beams are emitted in a single direction, said optical system adapted to scan simultaneously a plurality of lines on said photoreceptor, thereby forming an image consisting of many dots on said photoreceptor, wherein said laser beams have a difference in wavelength among each other which does not exceed 12 nm so that a deviation of primary scanning direction among said plurality of laser beams on said photoreceptor is less than a diameter of one of said dots.

2. The image forming apparatus of claim 1, wherein the optical system has a rotary reflector for changing optical paths of the plurality of laser beams, and thereby scan simultaneously the plurality of lines on the photoreceptor.

3. The image forming apparatus of claim 1, wherein the optical system has a fθ lens.

4. The image forming apparatus of claim 1 wherein said composing device is a prism.

5. The image forming apparatus of claim 1 wherein each of the plurality of said generating devices is a semiconductor generating device.

6. The image forming apparatus of claim 1 wherein said laser beam generating devices are in independent positions spaced apart from each other and forming an angle other than 0° and 180° with each other.

7. An image forming apparatus comprising:
   (a) a photoreceptor;
   (b) a plurality of laser beam generating devices for generating a plurality of laser beams;
   (c) an optical system, including a composing device through which said laser beams pass and from which said laser beams are emitted in a single direction, said optical system adapted to scan simultaneously a plurality of lines on said photoreceptor, thereby forming an image consisting of many dots on said photoreceptor, wherein said laser beams have a difference in wavelength among each other which does not exceed 1/4000 of a diameter of one of said dots so that a deviation of primary scanning direction among said plurality of laser beams on said photoreceptor is less than a diameter of one of said dots.

8. The image forming apparatus of claim 7 wherein the plurality of laser beam generating devices are provided at independent positions spaced apart from each other and are at an angle other than 0° and 180° with each other.

9. The image forming apparatus of claim 7 wherein the optical system has a rotary reflector for changing optical paths of the plurality of laser beams, and thereby scan simultaneously the plurality of lines on the photoreceptor.

10. The image forming apparatus of claim 7 wherein the optical system has a fθ lens.

11. The image forming apparatus of claim 7 wherein said composing device is a prism.

12. The image forming apparatus of claim 7 wherein each of the plurality of said generating devices is a semiconductor generating device.

* * * * *